(12) United States Patent
Wolf et al.

(10) Patent No.: US 8,533,259 B2
(45) Date of Patent: Sep. 10, 2013

(54) EFFICIENT REAL-TIME STITCHING OF MULTIMEDIA FILES

(75) Inventors: Amir Wolf, Cupertino, CA (US); Sumit Roy, Palo Alto, CA (US)

(73) Assignee: Rhythm NewMediaInc., Mountain View, CA (US)

( * ) Notice: Subject to any disclaimer, the term of this patent is extended or adjusted under 35 U.S.C. 154(b) by 272 days.

(21) Appl. No.: 13/014,867

(22) Filed: Jan. 27, 2011

(65) Prior Publication Data

US 2012/0197966 A1    Aug. 2, 2012

(51) Int. Cl.
*G06F 15/16* (2006.01)

(52) U.S. Cl.
USPC .............. 709/203; 725/32; 725/36; 709/238; 709/240

(58) Field of Classification Search
None
See application file for complete search history.

(56) References Cited

U.S. PATENT DOCUMENTS

| | | | |
|---|---|---|---|
| 7,383,497 B2 * | 6/2008 | Glenner et al. ............... | 715/231 |
| 8,218,651 B1 * | 7/2012 | Eshet et al. ............... | 375/240.26 |
| 2006/0149785 A1 | 7/2006 | Ornstein et al. | |
| 2008/0207182 A1 | 8/2008 | Maharajh et al. | |
| 2009/0097823 A1 * | 4/2009 | Bhadkamkar et al. .......... | 386/96 |
| 2009/0169176 A1 * | 7/2009 | Thornburg et al. ............. | 386/84 |
| 2009/0254572 A1 | 10/2009 | Redlich et al. | |
| 2011/0007797 A1 * | 1/2011 | Palmer et al. ............ | 375/240.01 |
| 2011/0066703 A1 * | 3/2011 | Kaplan et al. ................. | 709/219 |
| 2011/0093885 A1 * | 4/2011 | Ravula ............. | 725/32 |
| 2011/0125710 A1 * | 5/2011 | Barnes et al. ................. | 707/621 |
| 2011/0239078 A1 * | 9/2011 | Luby et al. .................... | 714/752 |

OTHER PUBLICATIONS

Mughal, Mudassar A. "Dynamic Stitching Framework for Nextshare." Thesis. Royal Institute of Technology, Stockholm, 2009. Print.*
Conklin, Gregory J., Gary S. Greenbaum, Karl O. Lillevold, Alan F. Lippman, and Yuriy A. Reznik. "Video Coding for Streaming Media Delivery." IEEE Transactions on Circuits and Systems for Video Technology 11.3 (2011): 269-81. IEEE Xplore. Web. Dec. 6, 2012.*
PCT International Search Report and Written Opinion, PCT Application No. PCT/US12/20689, May 4, 2012, 15 pages.

* cited by examiner

*Primary Examiner* — Aravind Moorthy
*Assistant Examiner* — Jason Plotkin
(74) *Attorney, Agent, or Firm* — Fenwick & West LLP

(57) ABSTRACT

A system and methods are disclosed for serving combined media using resource metadata referencing original media data. Combined resource metadata is created from combining the metadata of two or more files for a virtual media file representing the requested combined media. The combined data can be adjusted to synch audio and video portions as needed for combining the files. The virtual media file references the original media files and serves the content on-the-fly, rather than creating a new file with the combined media, at a savings of server response time and memory consumption, while maintaining high performance.

20 Claims, 3 Drawing Sheets

EFFICIENT REAL-TIME STITCHING OF MULTIMEDIA FILES

BACKGROUND

The disclosure generally relates to the field of serving multimedia files, and more specifically, to combining multimedia files on-the-fly for serving using resource metadata.

Most existing technologies for serving media content use a static file serving interface, in which a complete file is served to a client. These technologies serve either entire files or client-requested byte ranges of files. If the requested media content is put together from a combination of original files, then the files typically are interleaved and written to the output as a new file. The file then typically is stored or cached on the server for playback.

Typically, if a user wants to view media content put together by interleaving, a specialized client player application is installed on the client system as a requirement for viewing the media. In some existing technologies the server and client player application use specialized protocols, file formats, and video encodings to transmit, decode and playback the media content.

From the above, there is lacking, inter alia, a system and process to serve multimedia content from combined files in real time, without the need for a specialized media player on the client or for creating a new file with the combined media.

SUMMARY

A system and method includes serving combined media using resource metadata referencing original media data. The disclosed configuration uses multimedia container files formatted such that the description of the media, such as metadata describing the number and type of tracks, location of sample data, video compression format, and timing information for media data, is stored on the server in a separate section from the media data itself (e.g., the media samples). Doing so allows a virtual media file to be created on-the-fly by the server using combined metadata based on the files to be combined and referencing the original media data, such that no new combined media file is created or temporarily stored. This method of stitching files together results in minimal server response time, high performance, and low memory consumption.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

The disclosed configurations have other advantages and features which will be more readily apparent from the following detailed description and the appended claims, when taken in conjunction with the accompanying drawings, in which:

DETAILED DESCRIPTION

The Figures and the following description relate to preferred embodiments by way of illustration only. It should be noted that from the following discussion, alternative embodiments of the structures and methods disclosed herein will be readily recognized as viable alternatives that may be employed without departing from the principles of the described embodiments.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and methods illustrated herein may be employed without departing from the principles of the described embodiments.

Systems and methods are disclosed for serving combined, or "stitched," media using resource metadata referencing original media data. Combined resource metadata is created from combining the metadata of two or more files for a virtual media file representing the requested combined media. The combined data can be adjusted to synch audio and video portions as needed for combining the files. The virtual media file references the media portions of the original media files and serves the content on-the-fly, or in "real-time," rather than creating a new file with the combined media.

System Architecture

Figure 1:
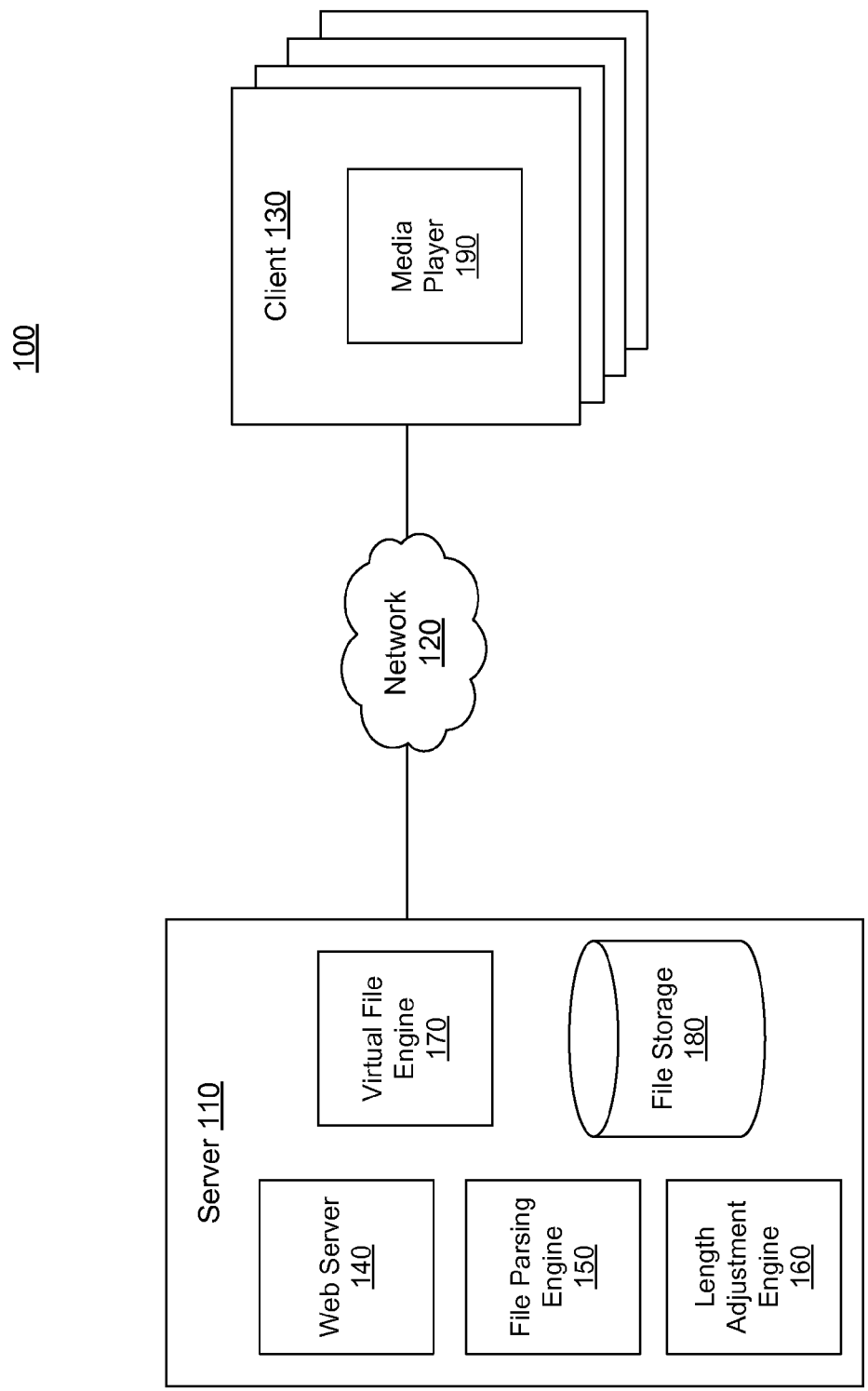
FIG. 1 illustrates an embodiment of a network diagram of a system for serving combined media using resource metadata referencing original media data.

Referring first to FIG. 1, it illustrates an embodiment of a network diagram of a system 100 for serving combined media using resource metadata referencing original media data. The system 100 includes a server 110 connected via a network 120 to one or more clients 130.

The server 110 is a computing device that receives via the network 120 requests for combined media from one or more client 130 and transmits responses to those clients 130 including the combined media. In one implementation, the server 110 operates as one or more high performance server class computers. The server 110 may be any machine capable of executing instructions (sequential or otherwise) that specify actions to be taken by that machine. In addition, the machine may be configured to include instructions stored as firmware. Further, while only a single server 110 is illustrated, the term "machine" shall also be taken to include any collection of machines that individually or jointly execute instructions to perform any one or more of the methodologies discussed herein.

The client 130 (or client device) comprises one or more computing devices that can receive input from a user and can transmit and receive data via the network 120. For example, the client 130 may be a desktop computer, a laptop computer, a smart phone, a personal digital assistant (PDA), or any other device including computing functionality and data communication capabilities. While only a client 130 is shown, the system 100 can support a large number of concurrent sessions with many clients.

The details of the hardware aspects of server and client computers are well known to those of skill in the art and are not further described here. The network 120 may comprise any combination of local area and/or wide area networks, using both wired and wireless communication systems.

The server 110 includes various components, instructions, and/or software for causing the machine to perform any one or more of the methodologies discussed herein, which may be embodied on a tangible computer-readable storage medium according to one embodiment. The term "machine-readable medium" should be taken to include a single medium or multiple media (e.g., a centralized or distributed database, or associated caches and servers) able to store instructions. The term "machine-readable medium" shall also be taken to include any medium that is capable of storing instructions. The term "machine-readable medium" includes, but not be limited to, data repositories in the form of solid-state memories, optical media, and magnetic media. According to one embodiment, the components for the server 110 comprise a web server 140, a file parsing engine 150, a length adjustment engine 160, a virtual file engine 170, and file storage 180. According to another embodiment, file storage 180 may be separate and accessed via the network 120, as indicated by the dotted lines.

The web server 140 links the server 110 to the one or more clients 130 via the network 120. The web server 140 serves multimedia files and associated metadata according to one embodiment, and may also serve web pages and other web-related content, such as JAVA, FLASH, XML, and so forth.

The file parsing engine 150 accesses and parses various media files as stored in file storage 180, which may by located on the server 110 or separate from the server 110 and accessed via the network 120, as indicated by the dotted lines. The file parsing engine 150 takes the file information as received in the client request and determines to which files it applies. The file parsing engine 150 can access both the media and metadata portions of the multimedia files, and can determine the lengths of the media portions, such as whether audio and video lengths are equal.

The length adjustment engine 160 is responsible for assessing length differences and adjusting media portion lengths. The length adjustment engine 160 can receive information from the file parsing engine 150 that audio and video media portions of a file are unequal, for example. The length adjustment engine 160 can determine a length difference between the media portions, and can adjust the length of the longer media portion accordingly. Alternatively, the length of the shorter media portion could be adjusted.

The virtual file engine 170 creates a virtual file and virtual file resource metadata corresponding to the virtual file. The virtual media file created represents the combined media requested by the client 130. The virtual media file includes only the resource metadata portion for the combined media; no actual media is combined into a new file with the combined media portions. The file storage 180 stores the media files. The file storage 180 may be a conventional database accessible by the various engines 140-170, e.g., via a user interface.

The client 130 needs only one component for the methods described herein, which is a media player 190. The media player 190 typically is software running on a client device for playing back multimedia files. Most media players 190 support an array of media formats, including both audio and video files. No other components are necessary for the client 130 to use play media as described herein.

Efficient Multimedia Stitching Using Resource Metadata

The methods as described herein use multimedia container files formatted such that the description of the media, such as metadata describing the number and type of tracks, location of sample data, video compression format, and timing information for the media portions, is stored on the server in a separate section from the media itself (e.g., the media samples). Doing so allows a virtual media file to be created on-the-fly by the server using metadata from files to be combined that reference the original media portions of the files, such that no new file with the combined media portions is created. This method of stitching files together results in minimal server response time, high performance, and low memory consumption.

Figure 2:
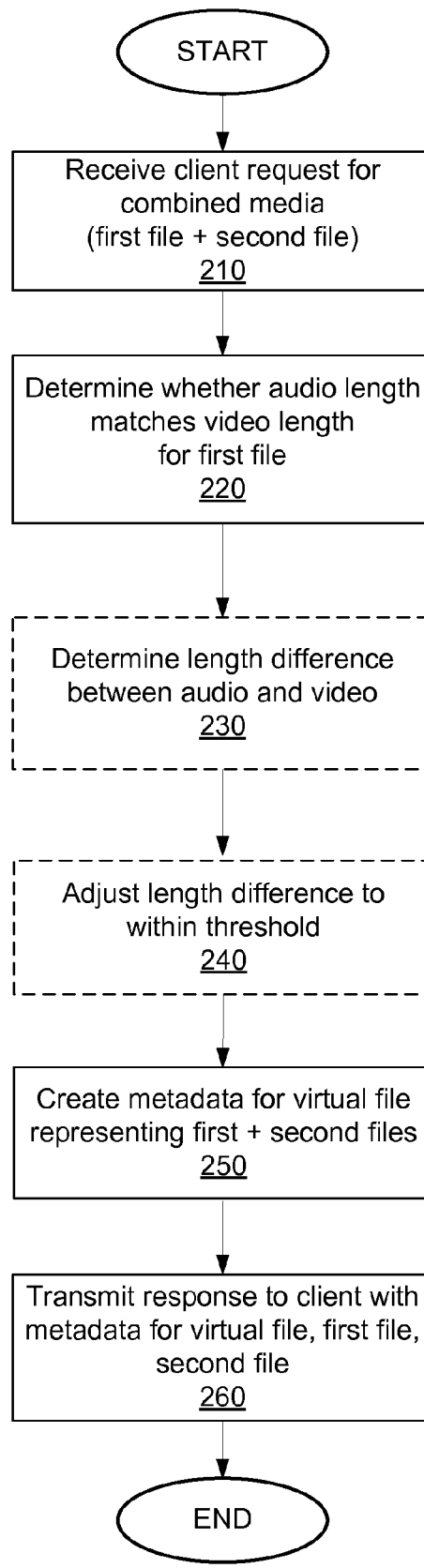
FIG. 2 is a flowchart showing an embodiment of a method for serving combined media using resource metadata referencing original media data instead of a combined media file.

FIG. 2 is a flowchart showing an embodiment of a method for serving combined media using resource metadata referencing original media portions instead of a new combined media file. Initially, a server 110 receives 210 a request from a client 130 for combined media, for example for combining media back-to-back such that the second media portion begins as the first one ends (e.g., without a pause in between the media portions for buffering, etc.). For ease of explanation, the method will be described using two files called File 1 and File 2, with File 1 being the "first" file in time with respect to the stitching and File 2 being the "second" in time (i.e., the served file looks like the media portion of File 1 followed by the media portion of File 2). However, in most embodiments, multiple files are stitched together, with audio/video adjustments being made to some or all of the media portions except for the last one.

Next, the server 110 accesses resource metadata for File 1. As indicated above, the resource metadata describes the media portion of File 1. From this information, the server 110 determines 220 whether the length of the audio media portion of File 1 and the video media portion for File 1 match (i.e., are equal). This determination is important because to merge File 2 with File 1 their respective media portions back-to-back, the two files must align at the attachment point, which is the terminal end of the audio and video media portions of File 1. The audio and video media portions for various media may not be equal for various reasons. For example, there may be silence at the end of a video, representing an end of the audio media portion before the end of a video. Similarly, difference in audio and video sampling rates may end up in a duration gap, also often media needs to be transcoded, e.g., into different codecs (flash, mpeg4, aac mp3, h264, etc.).

If there is a mismatch between the audio length and the video length for the media portions of the first file (File 1), the server 110 determines 230 a length difference between the audio and the video media portions of the first media file. For example, given an audio length and a video length, the server can determine the difference between the two lengths, e.g., in milliseconds. Then the method proceeds to step 240. If there is not a mismatch between the audio length and the video length for the first file (File 1), the method proceeds directly to step 250.

Assuming a mismatch between the audio length and the video length for the media portions first file (File 1), after the server 110 has determined 230 the length difference, the server 110 then adjusts 240 the length information within the resource metadata for the virtual file such that it is less than a threshold difference. For example, the server 110 may truncate either the audio or video (whichever is longer) media portion by dropping one or more samples for the last one or more chunks of File 1. E.g., given a length difference in which the audio media portion is 162 ms longer than the video media portion as indicated by the metadata, the server 110 could adjust the metadata to indicate dropping five samples (of 32 milliseconds (ms) each) to reduce the difference by 160, leaving only a 2 ms difference between the audio and video media portions, which difference is small enough for the audio and video media portions to be considered synched. If the number of samples that needs to be removed exceeds the samples in the last chunk, samples may be removed from the last two chunks, for example (or last three chunks, etc.), such that the correct number of samples are removed. The threshold difference according to one embodiment is determined based on the duration of each media portion, and can be adjusted to be within the range of one media sample duration. However, this value may vary for different files based on the frequency of the encoded audio, etc. The threshold may be higher or lower according to other embodiments. Alternatively to the above process, the shorter media portion could be adjusted in a similar manner, e.g., if the portions are 5 seconds and 4.5 seconds, 500 ms could be added to the shorter media portion.

Next the server 110 begins to generate a virtual media file that will represent the combined media requested by the client 130. The virtual media file includes only the resource metadata portion for the combined media; no actual media portion data is combined into a new file with the combined media portions. Instead the server 110 creates 250 resource metadata for the virtual media file representing the requested combined media. The resource metadata is created 250 from the (adjusted, in this example) resource metadata associated with the first media file (File 1) combined with the resource metadata associated with the second media file (File 2). In this example in which Files 1 and 2 are combined, the resource metadata for File 2 is merged the resource metadata for File 1 in the new resource metadata for the virtual media file, such that the media portion of File 2 is appended to the end of the media portion of File 1. In some embodiments, steps 230-250 could occur in a different order, in which the metadata first is created 350, and then the length difference of the media portions determined 230 and adjusted 240, for example.

Once the resource metadata for the virtual media file is created 250, the server 110 transmits a response to the client 130 that includes the resource metadata, the first media file, and the second media file, combined on-the-fly. Pointers associate the resource metadata with the corresponding media portions of the first (File 1) and second file (File 2). The client 130 then can play the combined media on the media player 190.

Example

Figure 3:
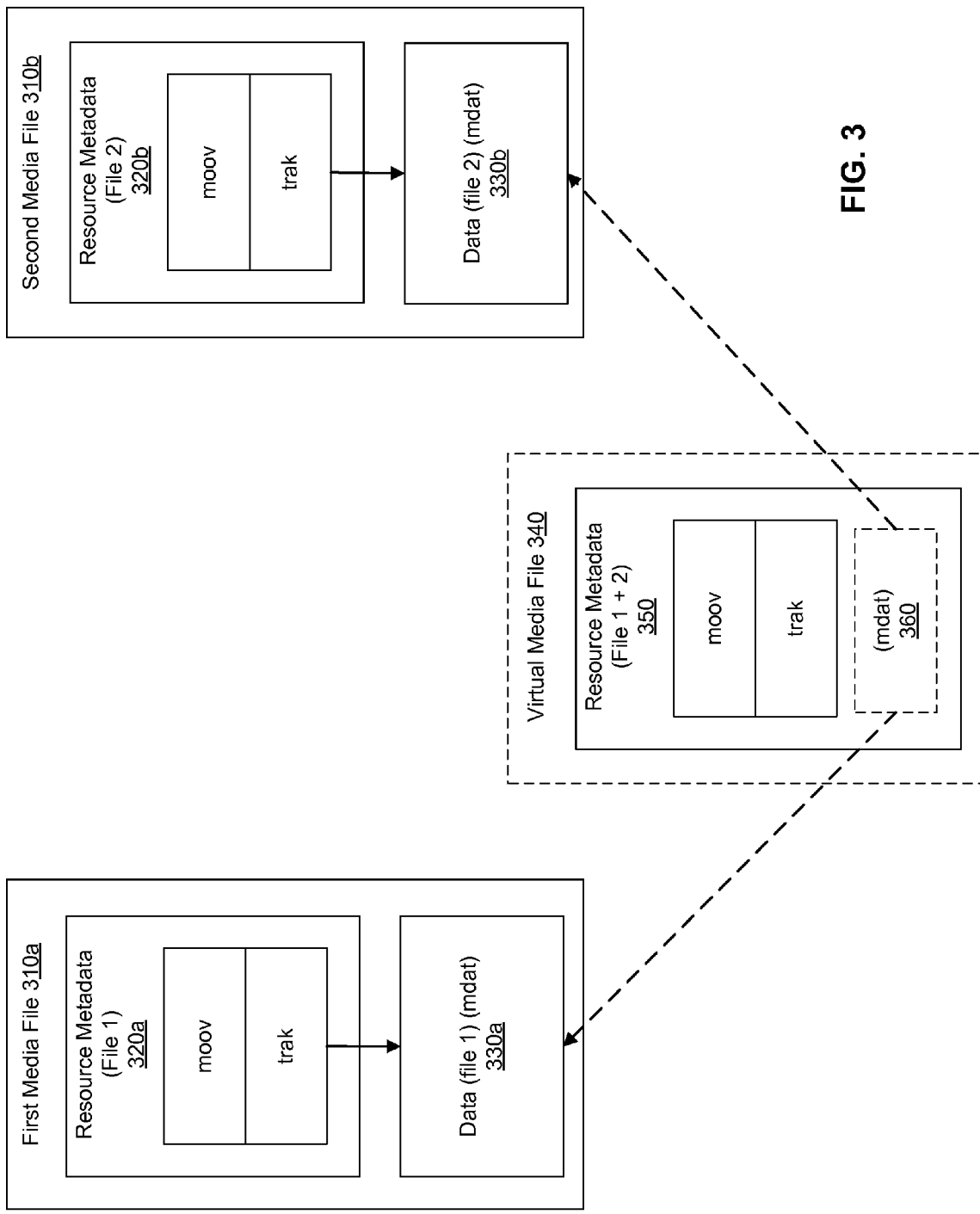
FIG. 3 is a block diagram showing one embodiment of exemplary file structures corresponding to the original files and virtual combined file.

To demonstrate the above-described method, an example will be shown for a desired combination of a multimedia advertisement (File 1) and a video clip (File 2), with reference to FIG. 2. Again, two files are being shown as not to complicate the example, however in most cases multiple files are stitched together, with audio/video adjustments being made to some or all of the files except for the last one. In addition, FIG. 3 is a block diagram showing one embodiment of file structures corresponding to the files (File 1 310*a*, File 2 310*b*, and Virtual Media File 340).

In this example, the ISO base file format is used, but any multimedia file format can be used according to various embodiments and implementations. In the ISO base file format, boxes (which are functionally equivalent to atoms in the QuickTime file format specification) are used for each file 310 for the resource metadata 320 and media files 330 described above. Specifically, a 'moov' box within the resource metadata 320 is used for general media file information (duration metadata, etc.), a 'trak' box within the resource metadata 320 is used for each media within the 'moov' file, and an 'mdat' box 330 for the media itself. In this example, the 'mdat' for File 1 310*a* has a length of 179287 (not including headers) and the 'mdat' for File 2 310*b* has a length of 675987 (not including headers).

Each 'trak' box holds information specifically about the individual media portion, e.g., type, codec, duration, etc., as well as tables that allow navigation of the media. A 'stbl' box holds the tables within the 'trak' box including 'stss' (sync sample table), 'stts' (decoding time to sample table; this table holds the duration of the frames), 'stsc' (sample to chunk table; this table defines the number of samples in the various chunks), and 'stco' (chunk offsets of chunks in the media container file). Exemplary tables of the type 'stsc' will be shown below.

Referring back to FIG. 2 briefly, once a request is received 210 at the server 110 for combined media, in this case File 1 (ad) plus File 2 (video clip), the server 110 determines 220 whether the audio and video lengths of the media portions of File 1 match by parsing the duration of the audio and video chunks in the 'trak' box corresponding to each of the audio and video media portions. In this example, File 1's media portion has a video duration (length) of 4.733 seconds and an audio length of 5.152 seconds. The server 110 determines 230 the length difference, e.g., a difference of 419 ms (audio longer than video) in this example. In this example, the length of the longer portion (the audio portion in this example) then is adjusted 240 to within a threshold indicating an acceptable difference (or a difference small enough to be considered synched).

The xml portion below corresponds to the 'stsc' of the audio of File 1:

```
<BoxInfo Size="76" Type="stsc"/>
<FullBoxInfo Version="0" Flags="0"/>
<SampleToChunkEntry FirstChunk="1" SamplesPerChunk="33" SampleDescriptionIndex="1"/>
<SampleToChunkEntry FirstChunk="2" SamplesPerChunk="31" SampleDescriptionIndex="1"/>
<SampleToChunkEntry FirstChunk="4" SamplesPerChunk="32" SampleDescriptionIndex="1"/>
<SampleToChunkEntry FirstChunk="5" SamplesPerChunk="20" SampleDescriptionIndex="1"/>
<SampleToChunkEntry FirstChunk="6" SamplesPerChunk="14" SampleDescriptionIndex="1"/>
```

As can be seen, this xml portion includes a total of five chunks, with respective number of samples 33 (chunk 1), 31 (2), 31 (3), 32 (4), 20 (5), and 14 (6). Recall that this audio is 419 ms longer than the corresponding video portion.

Referring back to FIG. 3, resource metadata 350 is created 250 for the virtual media file 340 based on combining the resource metadata 320*a*, 320*b* of the first media file (File 1, 310*a*, as adjusted) and the second media file (File 2, 310*b*). The resource metadata 350 for the virtual file 340 thus includes 'moov' and 'trak' boxes corresponding to the combined chunks from File 1 and File 2.

The next xml portion below corresponds to the 'stsc' of the combined audio files of File 1 and File 2, in which the audio media portion of File 1 has been truncated:

```
<BoxInfo Size="184" Type="stsc"/>
<FullBoxInfo Version="0" Flags="0"/>
<SampleToChunkEntry FirstChunk="1" SamplesPerChunk="33" SampleDescriptionIndex="1"/>
<SampleToChunkEntry FirstChunk="2" SamplesPerChunk="31" SampleDescriptionIndex="1"/>
<SampleToChunkEntry FirstChunk="4" SamplesPerChunk="32" SampleDescriptionIndex="1"/>
<SampleToChunkEntry FirstChunk="5" SamplesPerChunk="20" SampleDescriptionIndex="1"/>
<SampleToChunkEntry FirstChunk="6" SamplesPerChunk="1" SampleDescriptionIndex="1"/>
<SampleToChunkEntry FirstChunk="7" SamplesPerChunk="33" SampleDescriptionIndex="1"/>
```

-continued

```
<SampleToChunkEntry FirstChunk="8" SamplesPerChunk="31" SampleDescriptionIndex="1"/>
<SampleToChunkEntry FirstChunk="10" SamplesPerChunk="32" SampleDescriptionIndex="1"/>
<SampleToChunkEntry FirstChunk="11" SamplesPerChunk="31" SampleDescriptionIndex="1"/>
<SampleToChunkEntry FirstChunk="14" SamplesPerChunk="32" SampleDescriptionIndex="1"/>
<SampleToChunkEntry FirstChunk="15" SamplesPerChunk="31" SampleDescriptionIndex="1"/>
<SampleToChunkEntry FirstChunk="18" SamplesPerChunk="32" SampleDescriptionIndex="1"/>
<SampleToChunkEntry FirstChunk="19" SamplesPerChunk="31" SampleDescriptionIndex="1"/>
<SampleToChunkEntry FirstChunk="21" SamplesPerChunk="30" SampleDescriptionIndex="1"/>
```

As can be seen, the fifth chunk (chunk 6) now shows 1 sample per chunk instead of 14. This reduction of 13 samples, of 32 ms each, is a reduction of 416 ms, bringing the difference between the audio and video media portions to 3 ms, which is considered synched. The remaining chunks correspond to the second audio portion (audio for File 2). As indicated above, steps 230-250 alternatively could occur in a different order.

Looking at the above example of modifications in order to conduct audio and video synchronization, consider modified additional tables in order to maintain the validity of the file. For the above mentioned 13 audio samples which were removed, and for the video track, the following should be modified:
Video Trak:
Stss in File 1

```
<SyncSampleBox EntryCount="2">
<BoxInfo Size="24" Type="stss"/>
<FullBoxInfo Version="0" Flags="0"/>
<SyncSampleEntry sampleNumber="1"/>
<SyncSampleEntry sampleNumber="69"/>
</SyncSampleBox>
```

Stss in File 2:

```
<SyncSampleBox EntryCount="4">
<BoxInfo Size="32" Type="stss"/>
<FullBoxInfo Version="0" Flags="0"/>
<SyncSampleEntry sampleNumber="1"/>
<SyncSampleEntry sampleNumber="63"/>
<SyncSampleEntry sampleNumber="138"/>
<SyncSampleEntry sampleNumber="213"/>
</SyncSampleBox>
```

Stss points to random access points that in the combined file looks like:

```
<SyncSampleBox EntryCount="6">
<BoxInfo Size="40" Type="stss"/>
<FullBoxInfo Version="0" Flags="0"/>
<SyncSampleEntry sampleNumber="1"/>
<SyncSampleEntry sampleNumber="69"/>
<SyncSampleEntry sampleNumber="72"/>
<SyncSampleEntry sampleNumber="134"/>
<SyncSampleEntry sampleNumber="209"/>
<SyncSampleEntry sampleNumber="284"/>
</SyncSampleBox>
```

All the second file sample numbers are up by 71, which is the number of video samples in the first file.
Stco in File 1

```
<ChunkOffsetBox EntryCount="5">
<BoxInfo Size="36" Type="stco"/>
<FullBoxInfo Version="0" Flags="0"/>
<ChunkEntry offset="2250"/>
<ChunkEntry offset="52214"/>
<ChunkEntry offset="86310"/>
<ChunkEntry offset="117232"/>
<ChunkEntry offset="143941"/>
</ChunkOffsetBox>
```

Stco in File 2:

```
<ChunkOffsetBox EntryCount="15">
<BoxInfo Size="76" Type="stco"/>
<FullBoxInfo Version="0" Flags="0"/>
<ChunkEntry offset="4234"/>
<ChunkEntry offset="37860"/>
<ChunkEntry offset="79930"/>
<ChunkEntry offset="102543"/>
<ChunkEntry offset="121875"/>
<ChunkEntry offset="192326"/>
<ChunkEntry offset="239922"/>
<ChunkEntry offset="281521"/>
<ChunkEntry offset="355527"/>
<ChunkEntry offset="406475"/>
<ChunkEntry offset="478060"/>
<ChunkEntry offset="533726"/>
<ChunkEntry offset="570339"/>
<ChunkEntry offset="636283"/>
<ChunkEntry offset="654110"/>
</ChunkOffsetBox>
```

Stco in the combined file:

```
<ChunkOffsetBox EntryCount="20">
<BoxInfo Size="96" Type="stco"/>
<FullBoxInfo Version="0" Flags="0"/>
<ChunkEntry offset="5178"/>
<ChunkEntry offset="55142"/>
<ChunkEntry offset="89238"/>
<ChunkEntry offset="120160"/>
<ChunkEntry offset="146869"/>
<ChunkEntry offset="184465"/>
<ChunkEntry offset="218091"/>
<ChunkEntry offset="260161"/>
<ChunkEntry offset="282774"/>
<ChunkEntry offset="302106"/>
<ChunkEntry offset="372557"/>
<ChunkEntry offset="420153"/>
<ChunkEntry offset="461752"/>
<ChunkEntry offset="535758"/>
<ChunkEntry offset="586706"/>
<ChunkEntry offset="658291"/>
<ChunkEntry offset="713957"/>
<ChunkEntry offset="750570"/>
<ChunkEntry offset="816514"/>
<ChunkEntry offset="834341"/>
</ChunkOffsetBox>
```

All values corresponding to the first file are up by 2928. This is the gap between the beginning of the data portion in the first file and the beginning of the data portion in the combined file. All values corresponding to the second file are up by 180231. This is the gap between the beginning of the data portion in the second file and the last byte of the data of the first file in the combined file.

For the audio portion:
In the Audio trak
Stts in File 1

```
<TimeToSampleBox EntryCount="1">
<BoxInfo Size="24" Type="stts"/>
<FullBoxInfo Version="0" Flags="0"/>
<TimeToSampleEntry SampleDelta="1024" SampleCount="161"/>
</TimeToSampleBox>
```

Stts in the combined file:

```
<TimeToSampleBox EntryCount="2">
<BoxInfo Size="32" Type="stts"/>
<FullBoxInfo Version="0" Flags="0"/>
<TimeToSampleEntry SampleDelta="1024" SampleCount="148"/>
<TimeToSampleEntry SampleDelta="1024" SampleCount="469"/>
</TimeToSampleBox>
```

The first entry corresponds to the first file and has 13 less entries due to removing 13 samples from the first file.
Stsz:
In File 1:

```
<SampleSizeBox SampleCount="161">
<BoxInfo Size="664" Type="stsz"/>
<FullBoxInfo Version="0" Flags="0"/>
```

In File 2:

```
<SampleSizeBox SampleCount="469">
<BoxInfo Size="1896" Type="stsz"/>
<FullBoxInfo Version="0" Flags="0"/>
```

In the combined file:

```
<SampleSizeBox SampleCount="617">
<BoxInfo Size="2488" Type="stsz"/>
<FullBoxInfo Version="0" Flags="0"/>
```

Here, 161+469=630; the combined file has 617 which is 13 less due to the removal of the 13 samples in the first file. Following the values of each entry it is noted that the missing entries are from the first file. Stco gets the new offset values as described in the video track. It is noted that Tables which may be modified, but are not in this example: Stco-Chunk offset table. In this example, removing the 13 samples did not end up in removing a whole chunk (the last chunk had 14 samples). If 15 samples had to be removed, the last chunk in the first file would be removed, which would end up in removing the last entry in Stco in the first file when generating the combined file. Moreover, if Stsc would look as follows in the first file:

```
<BoxInfo Size="64" Type="stsc"/>
<FullBoxInfo Version="0" Flags="0"/>
<SampleToChunkEntry FirstChunk="1" SamplesPerChunk="33" SampleDescriptionIndex="1"/>
<SampleToChunkEntry FirstChunk="2" SamplesPerChunk="31" SampleDescriptionIndex="1"/>
<SampleToChunkEntry FirstChunk="4" SamplesPerChunk="32" SampleDescriptionIndex="1"/>
<SampleToChunkEntry FirstChunk="7" SamplesPerChunk="14" SampleDescriptionIndex="1"/>
```

This means that chunk 5, 6 and 7 has 14 samples. To remove 15 samples, the new table would look as follows:

```
<BoxInfo Size="76" Type="stsc"/>
<FullBoxInfo Version="0" Flags="0"/>
<SampleToChunkEntry FirstChunk="1" SamplesPerChunk="33" SampleDescriptionIndex="1"/>
<SampleToChunkEntry FirstChunk="2" SamplesPerChunk="31" SampleDescriptionIndex="1"/>
<SampleToChunkEntry FirstChunk="4" SamplesPerChunk="32" SampleDescriptionIndex="1"/>
<SampleToChunkEntry FirstChunk="5" SamplesPerChunk="14" SampleDescriptionIndex="1"/>
<SampleToChunkEntry FirstChunk="6" SamplesPerChunk="13" SampleDescriptionIndex="1"/>
```

This removes a chunk, but adding an entry in Stsc, since the similarity of chunk 5 and 6 got broken.

As above, a response is transmitted to the client with the resource metadata for the virtual file, and with the first and second file media data. Note that the frames dropped from the 'stsc' table for the virtual media file are not dropped from the media portion 360, i.e., the first file (File 1) and second file (File 2) media portions remain intact. Only the resource metadata 350 for the virtual file 340 are changed to instruct some samples to be skipped during media play.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example processes described herein, e.g., as described in conjunction with FIGS. 2-3, may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosed embodiments. This description should be read to include one or at least one and the singular also includes the plural unless it is obvious that it is meant otherwise.

Upon reading this disclosure, those of skill in the art will appreciate still additional alternative structural and functional designs for efficient real-time stitching of multimedia files through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for serving combined media using resource metadata referencing original media data, comprising:
    receiving at a server from a client a request for combined media comprising a first media file and second media file;
    creating a virtual media file comprising resource metadata for the requested combined media, the resource metadata of the virtual media file combining resource metadata associated with the first media file and the second media file;
    determining from resource metadata associated with the first media file and the second media file whether audio length matches video length for media portions of the first and second media files;
    adjusting the resource metadata of the virtual media file, responsive to a determined mismatch between audio length and video length, such that a difference between audio length and video length for the media portion of the first media file is less than a threshold value, and making no adjustment to a determined mismatch between audio length and video length for the second media file; and transmitting a response from the server to the client comprising the virtual media file.

2. The method of claim 1, wherein the virtual media file does not include the first and second media files.

3. The method of claim 1, wherein determining whether the audio length matches the video length for the first media file comprises:

parsing the first media file for audio length and video length information.

4. The method of claim 1, wherein creating the virtual media file comprises:

merging the resource metadata associated with the second media file at a terminal end of the resource metadata associated with the first media file.

5. The method of claim 1, wherein the virtual media file provides pointers to the media portions of the first media file and the second media file.

6. The method of claim 1, wherein adjusting the resource metadata of the virtual media file comprises:

adjusting the resource metadata of the virtual media file to drop one or more audio or video samples at the end of the first media file.

7. The method of claim 1, wherein the threshold value is determined to be within range of one media sample duration.

8. The method of claim 1, wherein adjusting the resource metadata of the virtual media file comprises:

adjusting the resource metadata of the virtual media file to repeat one or more audio or video samples at the end of the first media file.

9. The method of claim 1, further comprising:

responsive to the determined mismatch between audio length and video length, determining a difference between audio length and video length for the media portion of the first media file.

10. The method of claim 1, further comprising:

in response to the received request for combined media further comprising a third media file, appending the resource metadata associated with the third media file to the resource metadata of the virtual media file;

determining from resource metadata of the virtual media file whether audio length matches video length for a combined media portion of the first and second media files; and in response to a mismatch between audio length and video length, adjusting the resource metadata of the virtual media file such that a difference between audio length and video length for the combined media portion of the first and second media files is less than a threshold value.

11. A non-transitory computer-readable storage medium configured to store instructions, the instructions when executed cause at least one processor to:

receive at a server from a client a request for combined media comprising a first media file and second media file;

create a virtual media file comprising resource metadata for the requested combined media, the resource metadata of the virtual media file combining resource metadata associated with the first media file and the second media file;

determine from resource metadata associated with the first media file and the second media file whether audio length matches video length for media portions of the first and second media files responsive to a determined mismatch between audio length and video length, adjust the resource metadata of the virtual media file such that a difference between audio length and video length for the media portion of the first media file is less than a threshold value, and make no adjustment to a determined mismatch between audio length and video length for the second media file; and transmit a response from the server to the client comprising the virtual media file.

12. The computer-readable storage medium of claim 11, wherein the instructions to determine whether the audio length matches the video length for the first media file comprises:

instructions to parse the first media file for audio length and video length information.

13. The computer-readable storage medium of claim 11, wherein the virtual media file provides pointers to the media portions of the first media file and the second media file.

14. The computer-readable storage medium of claim 11, wherein the instructions to adjust the resource metadata of the virtual media file comprises:

instructions to adjust the resource metadata of the virtual media file to drop one or more audio or video samples at the end of the first media file.

15. The computer-readable storage medium of claim 11, wherein the threshold value is determined to be within range of one media sample duration.

16. The computer-readable storage medium of claim 11, further comprising instructions that when executed cause the at least one processor to:

in response to the received request for combined media further comprising a third media file, appending the resource metadata associated with the third media file to the resource metadata of the virtual media file;

determine from resource metadata of the virtual media file whether audio length matches video length for a combined media portion of the first and second media files; and;

in response to a mismatch between audio length and video length adjust the resource metadata of the virtual media file such that a difference between audio length and video length for the combined media portion of the first and second media files is less than a threshold value.

17. A computer system for serving combined media using resource metadata referencing original media data, comprising:

a web server configured for receiving at a server from a client a request for combined media comprising a first media file and second media file; and a file engine configured for creating a virtual media file comprising resource metadata for the requested combined media, the resource metadata of the virtual media file combining resource metadata associated with the first media file and the second media file, the file engine further configured for determining from resource metadata associated with the first media file and the second media file whether audio length matches video length for media portions of the first and second media files, in responsive to a determined mismatch between audio length and video length, the file engine further configured for adjusting the resource metadata of the virtual media file such that a difference between audio length and video length for the media portion of the first media file is less than a threshold value, and making no adjustment to a determined mismatch between audio length and video length for the second media file, and the web server further configured for transmitting a response from the server to the client comprising the virtual media file.

18. The computer system of claim 17, wherein adjusting the resource metadata of the virtual media file comprises:

adjusting the resource metadata of the virtual media file to drop one or more audio or video samples at the end of the first media file.

19. The computer system of claim 17, wherein the virtual media file comprises pointers to the media portions of the first and second media files.

20. A method for serving combined media using resource metadata referencing original media data, the method comprising:

receiving at a server from a client a request for combined media comprising a plurality of media files in a sequence;

creating a virtual media file comprising pointers to the media portions of each of the plurality of media files in the sequence and resource metadata for the requested combined media, the resource metadata of the virtual media file combining resource metadata associated with each of the plurality of media files in the sequence;

determining from resource metadata associated with each of the plurality of media files in the sequence whether audio length matches video length for media portion of each of the plurality of media files;

responsive to a determined mismatch between audio length and video length in a respective media file, adjusting the resource metadata of the virtual media file such that a difference between audio length and video length for the respective media file is less than a threshold value, making no adjustment to a determined mismatch between audio length and video length for a last media file in the sequence of the plurality of media files for the combined media; and transmitting a response from the server to the client comprising the virtual media file.

\* \* \* \* \*